(12) United States Patent
Shirao et al.

(10) Patent No.: US 8,769,945 B2
(45) Date of Patent: Jul. 8, 2014

(54) WORK VEHICLE AND WORK VEHICLE CONTROL METHOD

(75) Inventors: Atsushi Shirao, Komatsu (JP); Takahisa Oasa, Hiratsuka (JP); Shinichi Kitao, Kanagawa (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/823,255

(22) PCT Filed: Sep. 4, 2012

(86) PCT No.: PCT/JP2012/072400
§ 371 (c)(1),
(2), (4) Date: Mar. 14, 2013

(87) PCT Pub. No.: WO2014/030265
PCT Pub. Date: Feb. 27, 2014

(65) Prior Publication Data
US 2014/0144129 A1 May 29, 2014

(30) Foreign Application Priority Data

Aug. 20, 2012 (JP) .................................. 2012-181592

(51) Int. Cl.
*F16D 31/02* (2006.01)
(52) U.S. Cl.
USPC .................................. 60/444; 60/445; 60/488
(58) Field of Classification Search
USPC .................... 60/443, 444, 445, 487, 488, 490
See application file for complete search history.

(56) References Cited

U.S. PATENT DOCUMENTS

| 4,395,878 | A | * | 8/1983 | Morita et al. | 60/444 |
|---|---|---|---|---|---|
| 4,561,250 | A | * | 12/1985 | Aoyagi et al. | 60/444 |
| 4,571,941 | A | * | 2/1986 | Aoyagi et al. | 60/444 |
| 8,532,886 | B1 | * | 9/2013 | Shirao et al. | 701/50 |
| 8,607,919 | B2 | * | 12/2013 | Shirao et al. | 180/307 |
| 8,639,429 | B2 | * | 1/2014 | Shirao | 701/82 |
| 8,646,263 | B2 | * | 2/2014 | Shirao | 60/490 |
| 8,649,945 | B2 | * | 2/2014 | Shirao | 701/50 |
| 8,666,610 | B2 | * | 3/2014 | Shirao | 701/50 |

FOREIGN PATENT DOCUMENTS

| JP | 11-182674 A | 7/1999 |
|---|---|---|
| JP | 2000-145955 A | 5/2000 |
| JP | 2008-267547 A | 11/2008 |
| JP | 2011-052794 A | 3/2011 |

* cited by examiner

*Primary Examiner* — Michael Leslie
(74) *Attorney, Agent, or Firm* — Global IP Counselors, LLP

(57) ABSTRACT

A pump displacement control cylinder is configured to control the displacement of a hydraulic pump according to pressure of hydraulic fluid and switches the discharge direction of the hydraulic fluid from the hydraulic pump according to the supply direction of the hydraulic fluid to the pump displacement control cylinder. A forward and backward progression switching valve is configured to switch the supply direction of the hydraulic fluid to the pump displacement control cylinder. A pressure control valve is configured to control the pressure of the hydraulic fluid supplied to the pump displacement control cylinder according to a command value input to the pressure control valve. A control section is configured to execute pump shuttle control which reduces the command value to the pressure control valve when switching between forward and backward progression using a forward and backward progression operation member.

13 Claims, 10 Drawing Sheets

WORK VEHICLE AND WORK VEHICLE CONTROL METHOD

CROSS-REFERENCE TO RELATED APPLICATIONS

This application claims priority to Japanese Patent Application No. 2012-181592 filed on Aug. 20, 2012, the disclosure of which is hereby incorporated herein by reference in its entirety.

TECHNICAL FIELD

The present invention relates to a work vehicle and a work vehicle control method.

BACKGROUND ART

Typically, a so-called HST (Hydro Static Transmission) is mounted in a work vehicle such as a wheel loader. A HST type of work vehicle drives a hydraulic pump using an engine and drives a movement hydraulic motor using hydraulic fluid which is discharged from the hydraulic pump. Due to this, the work vehicle moves. In such an HST type of work vehicle, it is possible to control vehicle speed and traction force by controlling the rotation speed of the engine, the displacement of the hydraulic pump, the displacement of the movement hydraulic motor, and the like.

As disclosed in Japanese Laid-open Patent Application Publication No. 2011-052794, the displacement of the hydraulic pump is controlled using a pump displacement control cylinder. The pump displacement control cylinder controls the displacement of the hydraulic pump according to pressure of hydraulic fluid which is supplied to the pump displacement control cylinder (referred to below as "pump pilot pressure"). In the work vehicle which is disclosed in Japanese Laid-open Patent Application Publication No. 2011-052794, the pressure of the hydraulic fluid from a charge pump is supplied to the pump displacement control cylinder by adjusting an engine sensing valve (a speed sensing valve). The hydraulic fluid which is discharged from the charge pump is supplied to a pilot port of the engine sensing valve. The charge pump is a fixed displacement pump which is driven using the engine. As a result, the engine sensing valve changes the pump pilot pressure according to the rotation speed of the engine.

On the other hand, the work vehicle is provided with a forward and backward progression operation member and a forward and backward progression switching valve. The forward and backward progression operation member is operated by an operator in order to switch forward and backward progression of the vehicle. The forward and backward progression switching valve switches the supply direction of the hydraulic fluid to the pump displacement control cylinder. A controller switches the supply direction of the hydraulic fluid to the pump displacement control cylinder using the forward and backward progression switching valve when switching between forward and backward progression using the forward and backward progression operation member is detected. Due to this, the discharge direction of the hydraulic fluid from the hydraulic pump is switched; and as a result, the progression direction of the vehicle is switched from forward progression to backward progression or from backward progression to forward progression.

SUMMARY

From the point of view of improving the operability of the work vehicle, there is a demand for an improvement in responsiveness of control of the hydraulic pump is demanded. However, in the work vehicle which is disclosed in Japanese Laid-open Patent Application Publication No. 2011-052794, the pump pilot pressure is adjusted according to the rotation speed of the engine using the engine sensing valve. Since the engine sensing valve is controlled according to the pressure of the hydraulic fluid from the charge pump, there is a limit to improvements in the responsiveness of the control of the hydraulic pump.

In addition, the pump pilot pressure varies according to changes in the pressure of the hydraulic fluid which is discharged from the charge pump. As a result, there is a possibility that the pump pilot pressure may vary in an overly sensitive manner according to variation in the rotation speed of the engine. In order to suppress sensitive responses in the pump pilot pressure, it is effective to provide an aperture between the pump displacement control cylinder and the engine sensing valve.

The inventors of the present application proposed the use of a pressure control valve which is controlled using a command signal from the controller instead of the engine sensing valve. The pressure control valve controls the pump pilot pressure according to the command signal from the controller. Due to this, it is possible to improve the responsiveness of the control of the hydraulic pump.

In addition, different to a case where the engine sensing valve is used, it is possible to arbitrarily control the pump pilot pressure by using the pressure control valve described above. As a result, it is possible to easily suppress sensitive variation in the pump pilot pressure without using an aperture such as described above.

However, the inventors of the present application found that there is a problem in that a shock is generated in the vehicle when switching between forward and backward progression of the work vehicle in a case where the aperture is not used. The inventors of the present application proposed that such a shock is due to a sudden increase in the pump pilot pressure when switching between forward and backward progression. It is possible to suppress such sudden variation in the pump pilot pressure by using an aperture. However, the improvement in responsiveness which is acquired using the pressure control valve described above is lost in a case where the aperture is used.

An object of the present invention is to provide a work vehicle where it is possible to improve the responsiveness of control of a hydraulic pump and to suppress shocks when switching between forward and backward progression.

A work vehicle according to a first aspect of the present invention is provided with an engine, a hydraulic pump, a hydraulic motor, a pump displacement control cylinder, a forward and backward progression switching valve, a pressure control valve, a forward and backward progression operation member, and a control section. The hydraulic pump discharges hydraulic fluid due to being driven by the engine. The hydraulic pump is able to change the discharge direction of the hydraulic fluid. The hydraulic motor is driven by the hydraulic fluid which is discharged from the hydraulic pump. The hydraulic motor changes a driving direction between a forward progression direction and a backward progression direction according to the discharge direction of the hydraulic fluid from the hydraulic pump. The pump displacement control cylinder controls the displacement of the hydraulic pump according to pump pilot pressure. The pump displacement cylinder switches the discharge direction of the hydraulic fluid from the hydraulic pump according to the supply direction of the hydraulic fluid which is supplied to the pump displacement control cylinder. The forward and backward progression switching valve switches the supply direction of the hydraulic fluid to the pump displacement control cylinder. The pressure control valve controls the pressure of the hydraulic fluid, that is, the pump pilot pressure, which is supplied to the pump displacement control cylinder according to a command value which is input to the pressure control valve. The forward and backward progression operation member is configured to be operated in order to switch forward and backward progression of the vehicle. The control section executes pump shuttle control which reduces the command value to the pressure control valve when switching between forward and backward progression using the forward and backward progression operation member.

A work vehicle according to a second aspect of the present invention is the work vehicle according to the first aspect wherein the control section deactivates the pump shuttle control in the pump shuttle control when a first predetermined period of time has elapsed since the time of switching between forward and backward progression.

A work vehicle according to a third aspect of the present invention is the work vehicle according to the second aspect wherein the control section sets the first predetermined period of time when the vehicle speed is equal to or more than a first speed threshold to be longer than the first predetermined period of time when the vehicle speed is less than the first speed threshold.

A work vehicle according to a fourth aspect of the present invention is the work vehicle according to any of the first to the third aspects wherein the control section reduces the command value as the vehicle speed increases in the pump shuttle control when the vehicle speed is equal to or more than a second speed threshold.

A work vehicle according to a fifth aspect of the present invention is the work vehicle according to the fourth aspect wherein the control section holds the rate of reduction in the command value constant irrespective of changes in the vehicle speed in the pump shuttle control when the vehicle speed is less than the second speed threshold.

A work vehicle according to a sixth aspect of the present invention is the work vehicle according to the fourth or the fifth aspect wherein the control section sets the command value to zero in the pump shuttle control when the vehicle speed is equal to or more than a third speed threshold which is higher than the second speed threshold.

A work vehicle according to a seventh aspect of the present invention is the work vehicle according to any of the first to the sixth aspects wherein the control section does not execute the pump shuttle control when the vehicle speed is smaller than a fourth speed threshold.

A work vehicle according to an eighth aspect of the present invention is the work vehicle according to any of the first to the seventh aspects which is further provided with an acceleration operation member for setting a target rotation speed for the engine. The control section increases the command value in the pump shuttle control when an operation amount of the acceleration operation member is a first operation amount more than the command value when an operation amount of the acceleration operation member is a second operation amount which is smaller than the first operation amount.

A work vehicle according to a ninth aspect of the present invention is the work vehicle according to any of the first to the eighth aspects which is further provided with a first drive circuit and a second drive circuit which connect the hydraulic pump and the hydraulic motor. The hydraulic fluid which flows out from the hydraulic motor flows into the hydraulic pump via the second drive circuit when the hydraulic fluid which flows out from the hydraulic pump flows into the hydraulic motor via the first drive circuit. The hydraulic fluid which flows out from the hydraulic motor flows into the hydraulic pump via the first drive circuit when the hydraulic fluid which flows out from the hydraulic pump flows into the hydraulic motor via the second drive circuit. The hydraulic pressure in the circuit out of the first drive circuit and the second drive circuit which is the circuit where the hydraulic fluid flows from the hydraulic pump to the hydraulic motor is set as a drive circuit pressure and the hydraulic pressure in the circuit out of the first drive circuit and the second drive circuit which is the circuit where the hydraulic fluid flows from the hydraulic motor to the hydraulic pump is set as the suction circuit pressure. The control section deactivates the pump shuttle control when the drive circuit pressure is equal to or more than a value where a predetermined pressure value is added to the suction circuit pressure.

A work vehicle according to a tenth aspect of the present invention is the work vehicle according to any of the first to the ninth aspects wherein the control section executes pump shuttle control at a point in time when a second predetermined period of time has elapsed since the time of switching between forward and backward progression using the forward and backward progression operation member.

A work vehicle according to an eleventh aspect of the present invention is the work vehicle according to any of the first to the tenth aspects wherein the control section returns the command value to its original value in the pump shuttle control by applying modulation after the command value has been reduced without modulation being applied.

A work vehicle according to a twelfth aspect of the present invention is the work vehicle according to any of the first to the eleventh aspects wherein the control section sets the command value to the pressure control valve to a normal command value, which is a value according to the rotation speed of the engine, during normal control when the pump shuttle control is deactivated. The control section reduces the command value to the pressure control valve to a value less than the normal command value in the pump shuttle control.

A control method of a work vehicle according to a thirteenth aspect of the present invention is provided with the following first step to fifth step. A first step is detecting an operation for switching forward and backward progression of the work vehicle using a forward and backward progression operation member. A second step is switching the supply direction of hydraulic fluid to a pump displacement control cylinder. A third step is switching the discharge direction of the hydraulic fluid from a hydraulic pump using the pump displacement control cylinder. A fourth step is switching the driving direction of a hydraulic motor according to the switching of the discharge direction of the hydraulic pump. A fifth step is reducing a pump pilot pressure when switching the forward and backward progression using the forward and backward operation member.

In the work vehicle according to the first aspect of the present invention, the control section executes the pump shuttle control when switching between forward and backward progression using the forward and backward progression operation member. In the pump shuttle control, the pump pilot pressure is reduced by reducing the command value to the pressure control valve. Due to this, it is possible to suppress sudden changes in an inclination angle of the hydraulic pump and to suppress shocks when switching between forward and backward progression. In addition, it is possible to improve responsiveness of control of the hydraulic pump since the use of an aperture is not necessary.

In the work vehicle according to the second aspect of the present invention, it is possible to return to normal control by deactivating the pump shuttle control after a period of time, where there is a possibility that a shock is generated from switching between forward and backward progression, has elapsed.

In the work vehicle according to the third aspect of the present invention, it is possible to maintain the pump shuttle control for a longer time when the vehicle speed is equal to or more than the first speed threshold than when the vehicle speed is less than the first speed threshold. The period of time when shocks are generated is longer when the vehicle speed is high. As a result, it is possible to suppress the generation of shocks by the pump shuttle control being maintained for a long time when the vehicle speed is high.

In the work vehicle according to the fourth aspect of the present invention, the pump pilot pressure is reduced as the vehicle speed increases when the vehicle speed is equal to or more than the second speed threshold. Due to this, it is possible to suppress the generation of shocks.

In the work vehicle according to the fifth aspect of the present invention, the rate of reduction in the command value is held constant irrespective of changes in the vehicle speed when the vehicle speed is less than the second speed threshold. There is hardly any change in the size or the generation time of the shocks even if there is a change in vehicle speed when the vehicle speed is extremely low. Accordingly, it is possible to avoid excessive reduction in the pump pilot pressure in such circumstances.

In the work vehicle according to the sixth aspect of the present invention, it is possible to reduce a minimum value of the pump pilot pressure in circumstances where the vehicle speed is high and it is possible for large shocks to be generated. Due to this, it is possible to suppress the generation of shocks even when the vehicle speed is high.

In the work vehicle according to the seventh aspect of the present invention, it is possible to avoid excessively reducing the pump pilot pressure in circumstances where only small shocks are generated.

In the work vehicle according to the eighth aspect of the present invention, the command value, when the operation amount of the acceleration operation member is the first operation amount which is comparatively high, is larger than the command value, when the operation amount of the acceleration operation member is the second operation amount which is comparatively low. That is, the amount of reduction in the command value is reduced. There are many cases when there are circumstances where the operator demands a high output when the operation amount of the acceleration operation member is large. As a result, it is possible to quickly recover output of the hydraulic pump after the completion of the pump shuttle control by reducing the amount of reduction in the command value when the operation amount of the acceleration operation member is large. In addition, the operator is not sensitive with regard to the shocks when the operation amount of the acceleration operation member is large.

In the work vehicle according to the ninth aspect of the present invention, the pump shuttle control is deactivated in circumstances where the traction force is large. The operator is not sensitive with regard to the shocks in circumstances when the traction force is large. As a result, it is possible to avoid unnecessary reduction in the pump pilot pressure.

In the work vehicle according to the tenth aspect of the present invention, it is possible to avoid the generation of shocks when switching between forward and backward progression without other conditions being established and without executing the shuttle control immediately after switching between forward and backward progression using the forward and backward progression operation member.

In the work vehicle according to the eleventh aspect of the present invention, it is possible to reduce the command value more swiftly when switching between forward and backward progression than when returning the command value to its original value. An inclination recovery force acts when driving the hydraulic pump. The inclination recovery force is a reaction force which acts in a direction to restore the inclination angle. For example, a reaction force is generated in a direction which restores the inclination angle to an angle in the backward progression direction when the hydraulic pump is driven in the forward progression direction. As a result, the inclination angle quickly changes toward the backward progression direction in an instant where forward progression is switched from forward progression to backward progression. In this case, there is a possibility that a large shock will be generated. In the work vehicle according to the eleventh aspect, it is possible to alleviate shocks due to the inclination recovery force since it is possible to swiftly reduce the command value when switching between forward and backward progression.

In the work vehicle according to the twelfth aspect of the present invention, it is possible to reduce the pressure of the hydraulic fluid which is supplied to the pump displacement control cylinder irrespective of the rotation speed of the engine during pump shuttle control. Due to this, it is possible to suppress the generation of shocks.

In the control method of the work vehicle according to the thirteenth aspect of the present invention, the pump pilot pressure is reduced when switching between forward and backward progression using the forward and backward progression operation member. Due to this, it is possible to suppress the generation of shocks when switching between forward and backward progression. In addition, it is possible to improve responsiveness of control of the hydraulic pump since the use of an aperture is not necessary.

DESCRIPTION OF THE EMBODIMENTS

Figure 1:
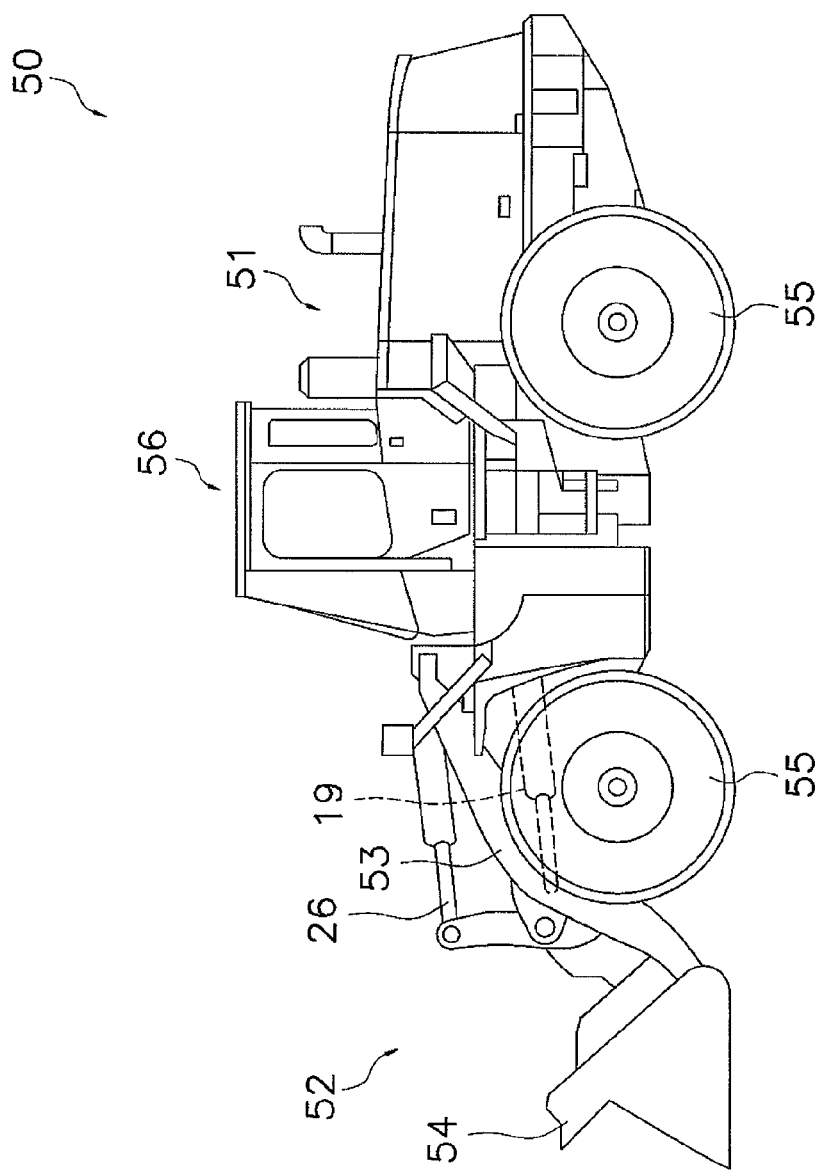
FIG. 1 is a side view diagram illustrating a configuration of a work vehicle according to an embodiment of the present invention.

Below, a work vehicle 50 according to an embodiment of the present invention will be described using the diagrams. FIG. 1 is a side view diagram of the work vehicle 50. The work vehicle 50 is a wheel loader. The work vehicle 50 is provided with a vehicle body 51, a work implement 52, a plurality of tires 55, and a cab 56. The work implement 52 is mounted to a front portion of the vehicle body 51. The work implement 52 has a boom 53, a bucket 54, a lift cylinder 19, and a bucket cylinder 26. The boom 53 is a member for lifting the bucket 54. The boom 53 is driven using the lift cylinder 19. The bucket 54 is attached to a tip edge of the boom 53. The bucket 54 carries out dumping and tilting using the bucket cylinder 26. The cab 56 is mounted on the vehicle body 51.

Figure 2:
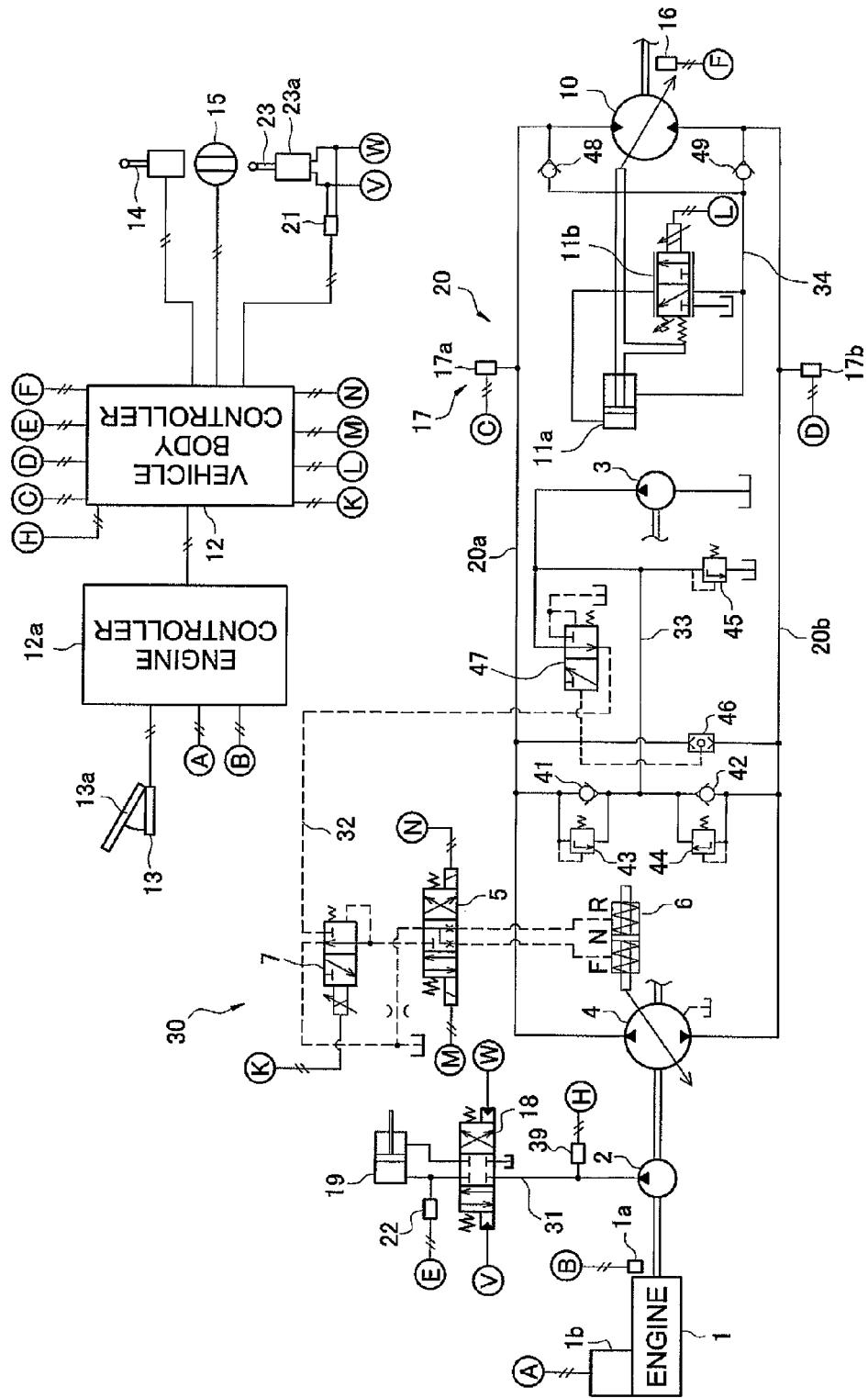
FIG. 2 is a hydraulic circuit diagram illustrating an HST system which is mounted in the work vehicle.

FIG. 2 is a block diagram illustrating a configuration of a hydraulic driving mechanism 30 which is mounted in the work vehicle 50. The hydraulic driving mechanism 30 mainly has an engine 1, a second hydraulic pump 2, a charge pump 3, a first hydraulic pump 4, a hydraulic motor 10, an engine controller 12a, a vehicle body controller 12, and a drive hydraulic circuit 20. In the hydraulic driving mechanism 30, hydraulic fluid is discharged due to the first hydraulic pump 4 being driven by the engine 1. The hydraulic motor 10 is driven using the hydraulic fluid which is discharged from the first hydraulic pump 4. Then, the work vehicle 50 moves due to the hydraulic motor 10 rotationally driving the tires 55 described above. That is, a so-called HST system with one pump and one motor is adopted in the hydraulic driving mechanism 30.

The engine 1 is a diesel engine and the output torque which is generated by the engine 1 is transmitted to the second hydraulic pump 2, the charge pump 3, the first hydraulic pump 4, and the like. An engine rotation speed sensor 1a which detects the actual rotation speed of the engine 1 is provided in the hydraulic driving mechanism 30. In addition, a fuel injection device 1b is connected to the engine 1. The engine controller 12a which will be described later controls the output torque (referred to below as "engine torque") and the rotation speed of the engine 1 by controlling the fuel injection device 1b according to the target engine rotation speed which has been set.

The first hydraulic pump 4 discharges the hydraulic fluid due to being driven by the engine 1. The first hydraulic pump 4 is a variable displacement type of hydraulic pump. The hydraulic fluid which is discharged from the first hydraulic pump 4 is sent to the hydraulic motor 10 by being passed through the drive hydraulic circuit 20. It is possible for the first hydraulic pump 4 to change the discharge direction of the hydraulic fluid. Specifically, the drive hydraulic circuit 20 has a first drive circuit 20a and a second drive circuit 20b. The hydraulic motor 10 is driven in one direction (for example, a forward progression direction) by the hydraulic fluid being supplied to the hydraulic motor 10 from the first hydraulic pump 4 via the first drive circuit 20a. The hydraulic motor 10 is driven in another direction (for example, a backward progression direction) by the hydraulic fluid being supplied to the hydraulic motor 10 from the first hydraulic pump 4 via the second drive circuit 20b.

A drive circuit pressure detection section 17 is provided in the drive hydraulic circuit 20. The drive circuit pressure detection section 17 detects the pressure of the hydraulic fluid (referred to below as "drive circuit pressure") which is supplied to the hydraulic motor 10 via the first drive circuit 20a or the second drive circuit 20b. Specifically, the drive circuit pressure detection section 17 has a first drive circuit pressure sensor 17a and a second drive circuit pressure sensor 17b. The first drive circuit pressure sensor 17a detects the fluid pressure of the first drive circuit 20a. The second drive circuit pressure sensor 17b detects the fluid pressure of the second drive circuit 20b. The first drive circuit pressure sensor 17a and the second drive circuit pressure sensor 17b send detection signals to the vehicle body controller 12. In addition, a forward and backward progression switching valve 5 and a pump displacement control cylinder 6 for controlling the discharge direction of the first hydraulic pump 4 are connected in the first hydraulic pump 4.

The forward and backward progression switching valve 5 is an electromagnetic control valve which switches the supply direction of the hydraulic fluid to the pump displacement control cylinder 6 based on a control signal from the vehicle body controller 12. The forward and backward progression switching valve 5 switches the discharge direction of the first hydraulic pump 4 by switching the supply direction of the hydraulic fluid to the pump displacement control cylinder 6. Specifically, the forward and backward progression switching valve 5 switches the discharge direction of the first hydraulic pump 4 between discharging to the first drive circuit 20a and discharging to the second drive circuit 20b.

The pump displacement control cylinder 6 is driven due to the hydraulic fluid being supplied via a pump pilot circuit 32 and changes the inclination angle of the first hydraulic pump 4. The pump displacement control cylinder 6 controls the displacement of the first hydraulic pump 4 according to the pressure of the hydraulic fluid which is supplied to the pump displacement control cylinder 6 via the pump pilot circuit 32 (referred to below as "pump pilot pressure"). In addition, the pump displacement control cylinder 6 switches the discharge direction of the hydraulic fluid from the first hydraulic pump 4 according to the supply direction of the hydraulic fluid which is supplied to the pump displacement control cylinder 6.

A pressure control valve 7 is arranged in the pump pilot circuit 32. The pressure control valve 7 connects the pump displacement control cylinder 6 to either the pump pilot circuit 32 or a hydraulic fluid tank. The pressure control valve 7 is an electromagnetic control valve which is controlled based on a control signal from the vehicle body controller 12. The pressure control valve 7 adjusts the inclination angle of the first hydraulic pump 4 by controlling the pump pilot pressure. The control of the pressure control valve 7 using the vehicle body controller 12 will be described later.

The pump pilot circuit 32 is connected to a charge circuit 33 and the hydraulic fluid tank via a cut off valve 47. A pilot port of the cut off valve 47 is connected to the first drive circuit 20a and the second drive circuit 20b via a shuttle valve 46. The shuttle valve 46 introduces the larger out of the fluid pressure of the first drive circuit 20a and the fluid pressure of the second drive circuit 20b into the pilot port of the cut off valve 47. Due to this, the drive circuit pressure is applied to the pilot port of the cut off valve 47.

The cut off valve 47 links the charge circuit 33 and the pump pilot circuit 32 when the drive circuit pressure is lower than a predetermined cut off pressure. Due to this, the hydraulic fluid is supplied from the charge circuit 33 to the pump pilot circuit 32. When the drive circuit pressure is equal to or more than the predetermined cut off pressure, the cut off valve 47 links the pump pilot circuit 32 to the hydraulic fluid tank and the hydraulic fluid in the pump pilot circuit 32 escapes into the hydraulic fluid tank. Due to this, the displacement of the first hydraulic pump 4 is reduced and an increase in the drive circuit pressure is suppressed due to the fluid pressure in the pump pilot circuit 32 being reduced.

The charge pump 3 is driven by the engine 1 and is a pump for supplying the hydraulic fluid to the drive hydraulic circuit 20. The charge pump 3 is connected to the charge circuit 33. The charge pump 3 supplies the hydraulic fluid to the pump pilot circuit 32 via the charge circuit 33.

The charge circuit 33 is connected to the first drive circuit 20a via a first check valve 41. The first check valve 41 permits flow of the hydraulic fluid from the charge circuit 33 to the first drive circuit 20a, but restricts flow of the hydraulic fluid from the first drive circuit 20a to the charge circuit 33. The charge circuit 33 is connected to the second drive circuit 20b via a second check valve 42. The second check valve 42 permits flow of the hydraulic fluid from the charge circuit 33 to the second drive circuit 20b, but restricts flow of the hydraulic fluid from the second drive circuit 20b to the charge circuit 33.

The charge circuit 33 is connected to the first drive circuit 20a via a first relief valve 43. The first relief valve 43 is open when the fluid pressure of the first drive circuit 20a is larger than a predetermined pressure. The charge circuit 33 is connected to the second drive circuit 20b via a second relief valve 44. The second relief valve 44 is open when the fluid pressure of the second drive circuit 20b is larger than a predetermined pressure.

The charge circuit 33 is connected to the hydraulic fluid tank via a low-pressure relief valve 45. The low-pressure relief valve 45 is opened when the fluid pressure of the charge circuit 33 is larger than a predetermined relief pressure. Due to this, the drive circuit pressure is adjusted so that the predetermined relief pressure is not exceeded. In addition, the predetermined relief pressure of the low-pressure relief valve 45 is very low compared to the relief pressure of the first relief valve 43 and the relief pressure of the second relief valve 44. Accordingly, the hydraulic fluid is supplied from the charge circuit 33 to the drive hydraulic circuit 20 via the first check valve 41 or the second check valve 42 when the drive circuit pressure is lower than the fluid pressure of the charge circuit 33.

The second hydraulic pump 2 is driven by the engine 1. The hydraulic fluid which is discharged from the second hydraulic pump 2 is supplied to the lift cylinder 19 via a work implement hydraulic circuit 31. Due to this, the work implement 52 is driven. In addition, the hydraulic fluid which is discharged from the second hydraulic pump 2 is supplied to a steering cylinder (not shown) via the work implement hydraulic circuit 31. Due to this, the orientation of the work vehicle 50 is changed. The discharge pressure of the second hydraulic pump 2 is detected using a discharge pressure sensor 39. The discharge pressure sensor 39 sends a detection signal to the vehicle body controller 12.

A work implement control valve 18 is provided in the work implement hydraulic circuit 31. The work implement control valve 18 is driven according to the operation amount of a work implement operation member 23. The work implement control valve 18 controls the flow amount of the hydraulic fluid which is supplied to the lift cylinder 19 according to the pilot pressure which is applied to the pilot port. The pilot pressure which is applied to the pilot port of the work implement control valve 18 is controlled using a pilot valve 23a of the work implement operation member 23. The pilot valve 23a applies the pilot pressure to the pilot port of the work implement control valve 18 according to the operation amount of the work implement operation member 23. Due to this, the lift cylinder 19 is controlled according to the operation amount of the work implement operation member 23.

The pilot pressure which is applied to the pilot port of the work implement control valve 18 is detected using a PCC pressure sensor 21. In addition, the pressure of the hydraulic fluid which is supplied to the lift cylinder 19 is detected using a boom pressure sensor 22. The PPC pressure sensor 21 and the boom pressure sensor 22 send detection signals to the vehicle body controller 12.

The hydraulic motor 10 is a variable displacement type of hydraulic motor. The hydraulic motor 10 is driven using the hydraulic fluid which is discharged from the first hydraulic pump 4. The hydraulic motor 10 is a motor for movement which generates a driving force for rotating the tires 55. The hydraulic motor 10 changes the driving direction to the forward progression direction and the backward progression direction according to the discharge direction of the hydraulic fluid from the first hydraulic pump 4.

A motor cylinder 11a and a motor displacement control section 11b are provided in the hydraulic motor 10. The motor cylinder 11a changes the inclination angle of the hydraulic motor 10. The motor displacement control section 11b is an electromagnetic control valve which is controlled based on a control signal from the vehicle body controller 12. The motor displacement control section 11b controls the motor cylinder 11a based on the control signal from the vehicle body controller 12.

The motor cylinder 11a and the motor displacement control section 11b are connected to a motor pilot circuit 34. The motor pilot circuit 34 is connected to the first drive circuit 20a via a check valve 48. The check valve 48 permits flow of the hydraulic fluid from the first drive circuit 20a to the motor pilot circuit 34, but restricts flow of the hydraulic fluid from the motor pilot circuit 34 to the first drive circuit 20a. The motor pilot circuit 34 is connected to the second drive circuit 20b via a check valve 49. The check valve 49 permits flow of the hydraulic fluid from the second drive circuit 20b to the motor pilot circuit 34, but restricts flow of the hydraulic fluid from the motor pilot circuit 34 to the second drive circuit 20b. The fluid pressure which is the larger out of the first drive circuit 20a and the second drive circuit 20b, that is, the hydraulic fluid of the drive circuit pressure, is supplied to the motor pilot circuit 34 using the check valves 48 and 49.

The motor displacement control section 11b switches the supply direction and the supply flow amount of the hydraulic fluid from the motor pilot circuit 34 to the motor cylinder 11a based on a control signal from the vehicle body controller 12. Due to this, it is possible for the vehicle body controller 12 to arbitrarily change the displacement of the hydraulic motor 10. In addition, it is possible to arbitrarily set the upper limit displacement and the lower limit displacement of the hydraulic motor 10.

A vehicle speed sensor 16 is provided in the hydraulic driving mechanism 30. The vehicle speed sensor 16 detects vehicle speed. The vehicle speed sensor 16 sends a detection signal to the vehicle body controller 12. The vehicle speed sensor 16 detects the vehicle speed by, for example, detecting the rotation speed of the tire driving shaft.

The work vehicle 50 is provided with an acceleration operation member 13a and a forward and backward progression operation member 14.

The acceleration operation member 13a is a member for the operator to set the target engine rotation speed. The acceleration operation member 13a is, for example, an acceleration pedal and is operated by the operator. The acceleration operation member 13a is connected to an acceleration operation amount sensor 13. The acceleration operation amount sensor 13 is configured by a potentiometer or the like. The acceleration operation amount sensor 13 sends an opening signal which indicates the operation amount of the acceleration operation member 13a (referred to below as "acceleration operation amount") to the engine controller 12a. It is possible for the operator to control the rotation speed of the engine 1 by adjusting the acceleration operation amount.

The forward and backward progression operation member 14 is operated by the operator in order to switch forward and backward progression of the vehicle. The operation position of the forward and reverse switching operation member 14 is switched to a forward progression position, a backward progression position, and a neutral position. The forward and backward progression operation member 14 sends an operation signal which indicates the position of the forward and backward progression operation member 14 to the vehicle body controller 12. It is possible for the operator to switch between forward progression and backward progression of the work vehicle 50 by operating the forward and backward progression operation member 14.

The engine controller 12a is an electronic control section which has a computation device such as a CPU, various types of memory, and the like. The engine controller 12a controls the engine 1 so that the target rotation speed which has been set is obtained.

Figure 3:
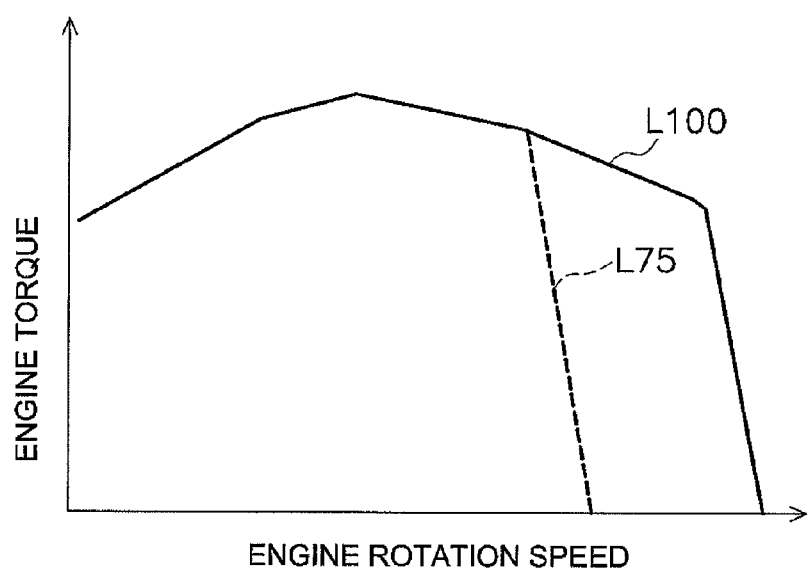
FIG. 3 is a diagram illustrating an example of output torque curves of an engine.

Output torque curves of the engine 1 are shown in FIG. 3. The output torque curves of the engine 1 show the relationship between the rotation speeds of the engine 1 and the size of the maximum engine torque which is able to be output by the engine 1 in each of the rotation speeds. In FIG. 3, the solid line L100 shows an engine output torque curve when the acceleration operation amount is 100%. This engine output torque curve is equivalent to, for example, a rating of the engine 1 or the maximum power output.

Here, an acceleration operation amount of 100% has the meaning of a state where the acceleration operation member 13a is being operated to the maximum. In addition, the dashed line L75 shows an engine output torque curve when the acceleration operation amount is 75%. The engine controller 12a controls the output of the engine 1 so that the engine torque is equal to or less than the engine output torque curve. The control of the output of the engine 1 is, for example, performed by controlling the upper value of the fuel injection amount to the engine 1.

The vehicle body controller 12 is an electronic control section which has a computation device such as a CPU, various types of memory, and the like. The vehicle body controller 12 is an example of the control section of the present invention. The vehicle body controller 12 controls the displacement of the first hydraulic pump 4 and the displacement of the hydraulic motor 10 by each control valve being electronically controlled based on output signals from each detection section. Specifically, the vehicle body controller 12 outputs a command signal to the pressure control valve 7 based on the engine rotation speed which is detected by the engine rotation speed sensor 1a. Due to this, the relationship between the pump displacement and the drive circuit pressure is regulated.

Figure 4:
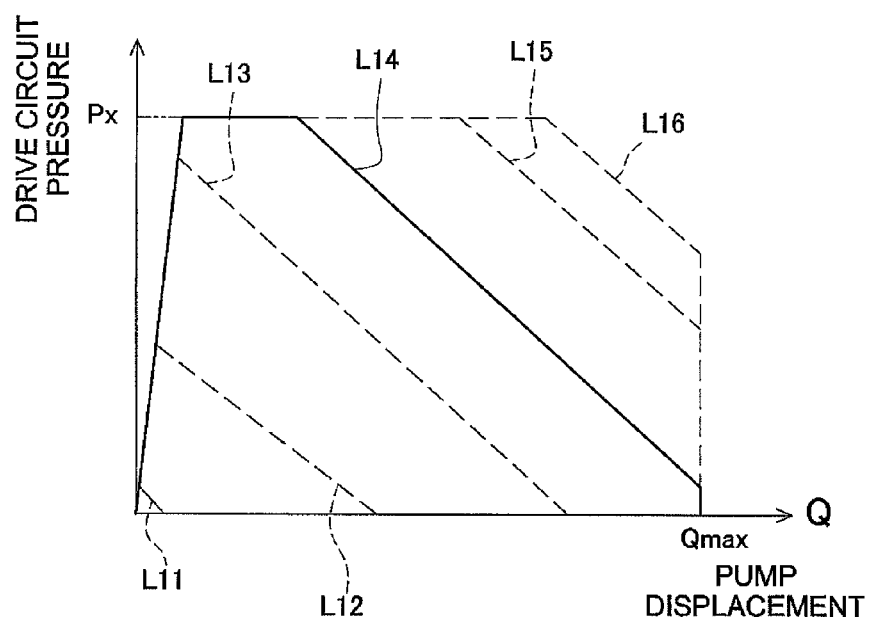
FIG. 4 is a diagram illustrating an example of pump displacement and drive circuit pressure characteristics.

An example of pump displacement and drive circuit pressure characteristics is shown in FIG. 4. The pump displacement and drive circuit pressure characteristics show the relationship of the pump displacement and the drive circuit pressure. L11 to L16 in the diagram are lines which indicate the pump displacement and drive circuit pressure characteristics which change according to the engine rotation speed.

Specifically, the vehicle body controller 12 controls the pump pilot pressure by controlling the opening of the pressure control valve 7 based on the engine rotation speed. Due to this, the pump displacement and drive circuit pressure characteristics are changed to L11 to L16.

Figure 5:
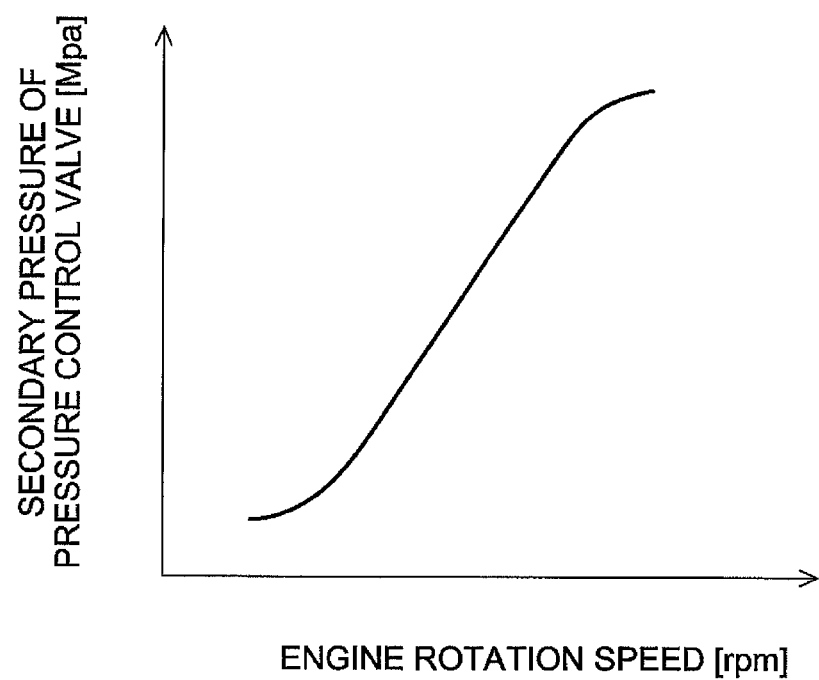
FIG. 5 is a diagram illustrating an example of a relationship of engine rotation speed and secondary pressure of a pressure control valve.

FIG. 5 is a diagram illustrating an example of a relationship of the engine rotation speed and secondary pressure of the pressure control valve 7. As shown in FIG. 5, the vehicle body controller 12 controls the pressure control valve 7 so that the secondary pressure of the pressure control valve 7 increases as the engine rotation speed increases. The pressure control valve 7 is controlled electrically using a command signal from the vehicle body controller 12. The pressure control valve 7 changes an opening according to a value in the command signal (referred to below as a "command value") from the vehicle body controller 12. The pressure control valve 7 increases the secondary pressure of the pressure control valve 7 as the command value from the vehicle body controller 12 increases. Accordingly, the vehicle body controller 12 increases the command value to the pressure control valve 7 as the engine rotation speed increases. Due to this, the secondary pressure of the pressure control valve 7, that is, the pump pilot pressure increases.

The pump displacement is controlled to correspond to the engine rotation speed and the driving circuit pressure according to the vehicle body controller 12 controlling the pressure control valve 7 as described above. The pump displacement and drive circuit pressure characteristics change from L11 toward L16 as the engine rotation speed increases.

The vehicle body controller 12 outputs a command signal for the motor displacement to the motor displacement control section 11b by processing the output signals from the engine rotation speed sensor 1a and the drive circuit pressure detection section 17. Here, the vehicle body controller 12 sets the motor displacement from the value of the engine rotation speed and the value of the drive circuit pressure by referencing motor displacement and drive circuit pressure characteristics which are stored in the vehicle body controller 12. The vehicle body controller 12 outputs an inclination angle change command, which corresponds to the motor displacement which has been set, to the motor displacement control section 11b.

Figure 6:
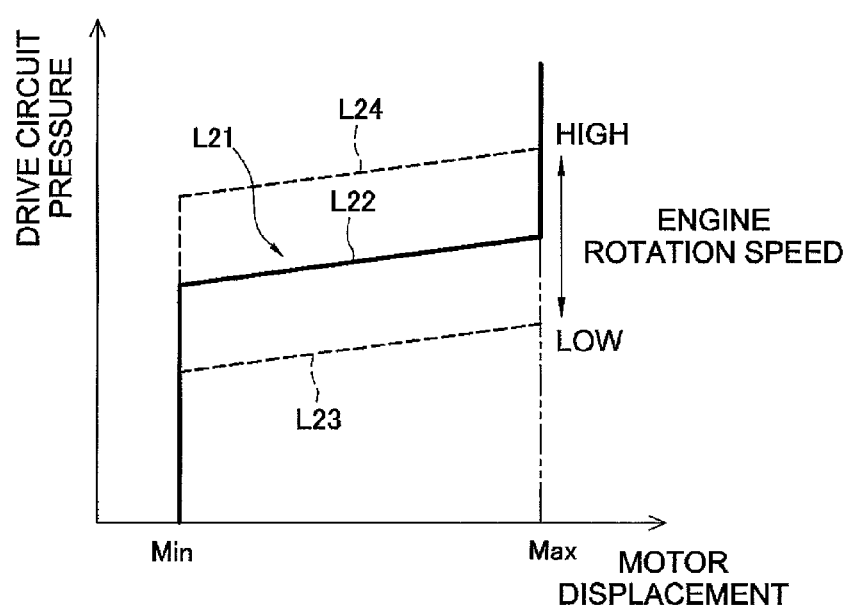
FIG. 6 is a diagram illustrating an example of motor displacement and drive circuit pressure characteristics.

An example of the motor displacement and drive circuit pressure characteristics is shown in FIG. 6. The solid line L21 in the diagram is a line where the motor displacement has been set with regard to the drive circuit pressure in a state where the engine rotation speed is a certain value. The motor displacement corresponds to the inclination angle of the hydraulic motor 10. The inclination angle is the minimum (Min) until a case where the drive circuit pressure is equal to or less than a certain value. After this, the inclination angle also gradually becomes larger in accompaniment with an increase in the drive circuit pressure (the inclined portion L22 of the solid line). Then, after the inclination angle becomes the maximum (Max), the inclination angle is maintained at the maximum inclination angle (Max) even if the drive circuit pressure increases.

The inclined portion L22 regulates the target pressure of the drive circuit pressure. That is, the vehicle body controller 12 increases the displacement of the hydraulic motor 10 when the drive circuit pressure is larger than the target pressure. In addition, the vehicle body controller 12 reduces the displacement of the hydraulic motor 10 when the drive circuit pressure is smaller than the target pressure. The target pressure is set according to the engine rotation speed. That is, the inclined portion L22 shown in FIG. 6 is set so as to rise and fall according to increases and decreases in the engine rotation speed.

Figure 7:
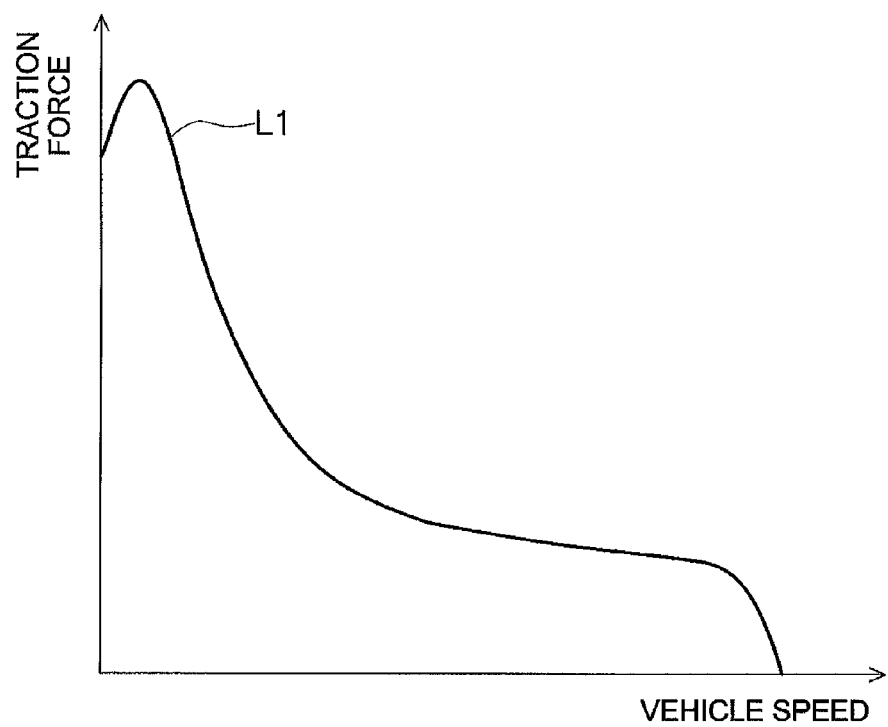
FIG. 7 is a diagram illustrating an example of a vehicle speed and traction force line diagram of the work vehicle.

Specifically, with regard to the inclined portion L22, the inclination angle becomes larger from a state where the drive circuit pressure is lower if the engine rotation speed is low and is controlled so as to reach the maximum inclination angle in a state where the drive circuit pressure is lower (refer to the inclined portion L23 of the dashed line at the lower side in FIG. 6). Conversely, the minimum inclination angle Min is maintained until the drive circuit pressure is higher if the engine rotation speed is high and is controlled so as to reach the maximum inclination angle Max in a state where the drive circuit pressure is higher (refer to the inclined portion L24 of the dashed line at the upper side in FIG. 6). Due to this, as shown by L1 in FIG. 7, it is possible for the work vehicle 50 to automatically change speed without an operation to shift gear from a vehicle speed of zero to the maximum vehicle speed by the traction force and the vehicle speed being changed in a stepless manner. Here, FIG. 7 is a diagram illustrating an example of a vehicle speed and traction force line diagram when the acceleration operation amount is at the maximum.

As described above, the vehicle body controller 12 controls the pressure control valve 7 according to the engine rotation speed so that the pump displacement and drive circuit pressure characteristics as shown in FIG. 4 are obtained (the control is referred to below as "normal control"). The vehicle body controller 12 executes pump shuttle control when switching between forward and backward progression using the forward and backward progression operation member 14. The vehicle body controller 12 reduces the command value to the pressure control valve 7 in the pump shuttle control to a value less than the command value during normal control. Below, the pump shuttle control will be described in detail.

Figure 8:
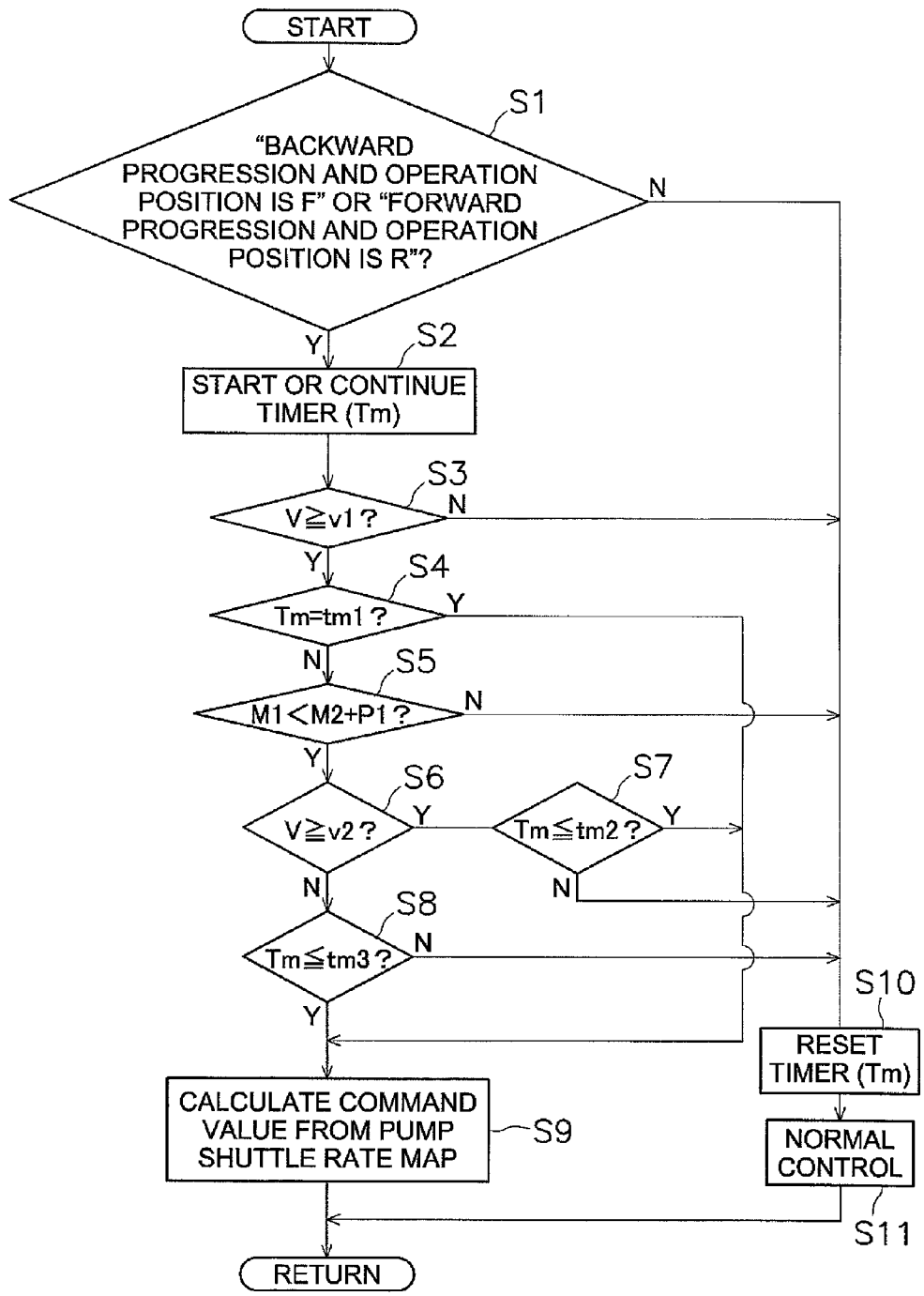
FIG. 8 is a flow chart illustrating a process of pump shuttle control.

FIG. 8 is a flow chart illustrating a process of the pump shuttle control. To begin with, in step S1, the vehicle body controller 12 determines whether or not "backward progression and operation position is F" or "forward progression and operation position is R". The "backward progression and operation position is F" has the meaning that the progression direction of the work vehicle 50 is the backward progression and the meaning that the operation position of the forward and backward progression operation member 14 is the forward progression position. The "forward progression and operation position is R" has the meaning that the progression direction of the work vehicle 50 is the forward progression and the meaning that the operation position of the forward and backward progression operation member 14 is the backward progression position. Here, the vehicle body controller 12 determines whether or not switching between the forward and backward progression using the forward and backward progression operation member 14 has been executed. In detail, the vehicle body controller 12 determines whether or not the vehicle state is "shuttle". "Shuttle" has the meaning of a state where the progression direction of the work vehicle 50 is the opposite to the direction which corresponds to the operation position of the forward and backward progression operation member 14.

When the vehicle state is "shuttle", the process proceeds to step S2. In step S2, a count of a timer Tm is started or the count of the timer Tm is continued. In a state where the count of the timer Tm has not been started, the count of the timer Tm is started when the process of step S2 is executed. The count of the timer TM is continued as it is when the process of step S2 is executed during execution of the count of the timer Tm.

In step S3, the vehicle body controller 12 determines whether or not vehicle speed V is equal to or more than a speed threshold v1. The speed threshold v1 is an example of the fourth speed threshold of the present invention. As the speed threshold v1, a value of a speed is set to the extent that it is possible for shocks to be generated when switching between forward and backward progression. For example, it is preferable that the speed threshold v1 be a low speed which is equal to or less than 1.0 km/h. When the vehicle speed V is equal to or more than the speed threshold v1, the process proceeds to step S4.

In step S4, the vehicle body controller 12 determines whether or not the timer Tm is a predetermined time tm1. The predetermined time tm1 is an example of the second predetermined period of time of the present invention. As the predetermined time tm1, a value is set to the extent that it is possible to confirm whether or not the operation of the forward and backward progression operation member 14 has been reliably performed. For example, it is preferable that the predetermined time tm1 be a short time which is equal to or less than 0.1 seconds. When the timer Tm is equal to or more than the predetermined time tm1, the process proceeds to step S9.

In step S9, the vehicle body controller 12 calculates the command value to the pressure control valve 7 from a pump shuttle rate map. That is, the vehicle body controller 12 reduces the command value to the pressure control valve 7 by applying the pump shuttle rate map to the calculation of the command value. Accordingly, the pump shuttle rate map is applied to the calculation of the command value irrespective of other conditions of step S5 and beyond when the predetermined time tm1 has elapsed after the start of the counting of the timer Tm. The process of step S9 will be described later.

In step S5, the vehicle body controller 12 determines whether or not a drive circuit pressure M1 is smaller than a value where a predetermined pressure value P1 has been added to a suction circuit pressure M2. As the predetermined pressure value P1, a value is set to correspond to the drive circuit pressure to the extent that the operator feels a drive force in the same direction as the operation position of the forward and backward progression operation member 14 after the switching by the forward and backward progression operation member 14.

Here, when the hydraulic fluid which has flowed out from the first hydraulic pump 4 flows into the hydraulic motor 10 via the first drive circuit 20a and the hydraulic fluid which flows out from the hydraulic motor 10 flows into the first hydraulic pump 4 via the second drive circuit 20b, the drive circuit pressure M1 is the hydraulic pressure of the first drive circuit 20a and the suction circuit pressure M2 is the hydraulic pressure of the second drive circuit 20b. When the hydraulic fluid which has flowed out from the first hydraulic pump 4 flows into the hydraulic motor 10 via the second drive circuit 20b and the hydraulic fluid which flows out from the hydraulic motor 10 flows into the first hydraulic pump 4 via the first drive circuit 20a, the drive circuit pressure M1 is the hydraulic pressure of the second drive circuit 20b and the suction circuit pressure M2 is the hydraulic pressure of the first drive circuit 20a. When the drive circuit pressure M1 is smaller than the value where the predetermined pressure value P1 has been added to the suction circuit pressure M2, the process proceeds to step S6.

In step S6, the vehicle body controller 12 determines whether or not the vehicle speed V is equal to or more than a speed threshold v2. The speed threshold v2 is an example of the first speed threshold of the present invention. The speed threshold v2 is higher than the speed threshold v1 in step S3. It is preferable that the speed threshold v2 be higher than 2 km/h. It is more preferable that the speed threshold v2 be equal to or more than 3 km/h. It is even more preferable that the speed threshold v2 be higher than 5 km/h. A predetermined time tm2 is longer than the predetermined time tm1.

When the vehicle speed V is equal to or more than the speed threshold v2, the process proceeds to step S7.

In step S7, the vehicle body controller 12 determines whether or not the timer Tm is equal to or more than the predetermined time tm2. The predetermined time tm2 is a pump shuttle control deactivate time when the vehicle speed V is equal to or more than the speed threshold v2. The predetermined time tm2 is a period of time where sufficient time has elapsed and drive force is necessary in the direction which has been set even in a case where the drive pressure is not established in a direction which has been set by the forward and backward progression operation member 14 (when step S5 is established). Due to this, it is possible to suppress time lag with regard to the operation of the forward and backward progression operation member 14 to be small. Here, the establishment of step S5 is when normally Tm≤tm2. It is preferable that the predetermined time tm2 be longer than 0.1 seconds. In addition, it is preferable that the predetermined time tm2 be shorter than 1.0 second. When the timer Tm is equal to or less than the predetermined time tm2, the process proceeds to step S9.

When the vehicle speed V is less than the speed threshold v2 in step S6, the process proceeds to step S8. In step S8, the vehicle body controller 12 determines whether or not the timer Tm is equal to or less than a predetermined time tm3. The predetermined time tm3 is longer than the predetermined time tm1. In addition, the predetermined time tm3 is equal to or less than the predetermined time tm2. The predetermined time tm3 is a pump shuttle control deactivate time when the vehicle speed V is less than the speed threshold v2. The predetermined time tm3 is a period of time where sufficient time has elapsed and drive force is necessary in the direction which has been set even in a case where the drive pressure is not established in a direction which has been set by the forward and backward progression operation member 14 (when step S5 is established). Due to this, it is possible to suppress time lag with regard to the operation of the forward and backward progression operation member 14 to be small. For example, when the vehicle body controller 12 recognizes that shuttling such as during digging work is being carried out and the drive pressure is not established, it is possible to avoid a state where the drive pressure never increases. Here, the establishment of step S5 is when normally Tm≤tm3. It is preferable that the predetermined time tm3 be longer than 0.1 seconds. In addition, it is preferable that the predetermined time tm3 be shorter than 1.0 second. When the timer Tm is equal to or less than the predetermined time tm3, the process proceeds to step S9.

When the state of the vehicle is not "shuttling" in step S1, the process proceeds to step S10. In step S10, the vehicle body controller 12 resets the timer Tm to zero. Then, the vehicle body controller 12 executes normal control in step S11. That is, the vehicle body controller 12 maintains the normal control as it is when the process of step S11 is executed during execution of the normal control. The vehicle body controller 12 deactivates the pump shuttle control and restores the normal control when the process of step S11 is executed during execution of the pump shuttle control.

When the vehicle speed is less than the speed threshold v1 in step S3, the vehicle body controller 12 resets the timer Tm in step S10 and executes the normal control in step S11.

When the drive circuit pressure M1 is equal to or more than the value where the predetermined pressure value P1 has been added to the suction circuit pressure M2 in step S5, the vehicle body controller 12 resets the timer Tm in step S10 and executes the normal control in step S11.

When the condition of step S7 or the condition of step S8 are not satisfied, the vehicle body controller 12 resets the timer Tm in step S10 and executes the normal control in step S11.

Above, the application conditions of the pump shuttle rate map are that all of the conditions from (1) to (3) below are established or that the condition (1) and (4) is established.

(1) The vehicle state is "shuttle" and the vehicle speed V is equal to or more than the speed threshold v1.

(2) It is established that device circuit pressure M1<suction circuit pressure M2+predetermined pressure value P1.

(3) The time which has elapsed since the vehicle state was "shuttle" is equal to or less than the predetermined time tm2 in a case where the vehicle speed V is equal to or more than the speed threshold v2 and the time which has elapsed since the vehicle state was "shuttle" is equal to or less than the predetermined time tm3 in a case where the vehicle speed V is less than the speed threshold v2.

(4) The time which has elapsed since the vehicle state was "shuttle" is the predetermined time tm1.

Figure 9:
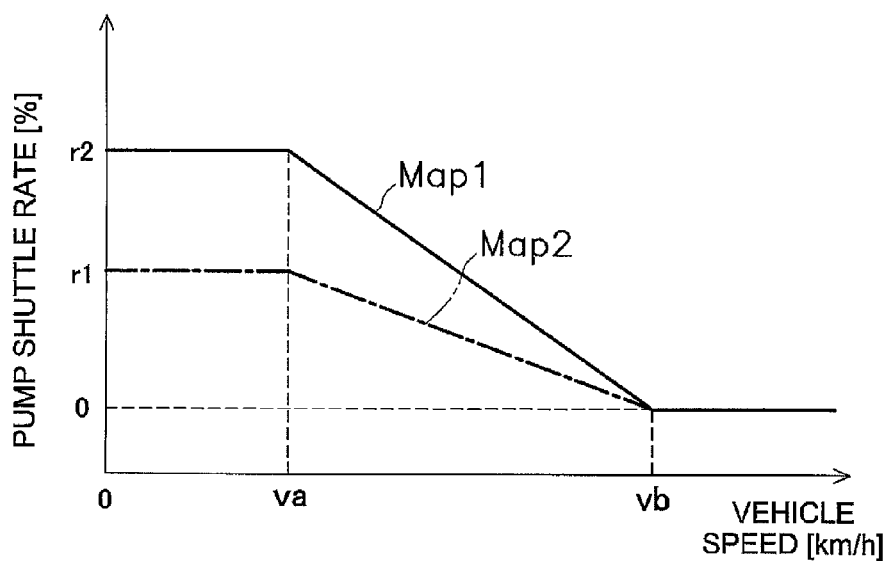
FIG. 9 is a diagram illustrating an example of a pump shuttle rate map.

Next, a method for calculating the command value to the pressure control valve 7, which is used in the application of the pump shuttle rate map shown in FIG. 9, will be described. FIG. 9 is a diagram illustrating an example of the pump shuttle rate map. The pump shuttle rate map regulates the relationship of the vehicle speed and a pump shuttle rate. The vehicle body controller 12 calculates a value, where the pump shuttle rate is multiplied with the command value to the pressure control valve 7 during normal control, as the command value to the pressure control valve 7 during the pump shuttle control. The pump shuttle rate includes values which are smaller than 100%.

In FIG. 9, a first pump shuttle rate map Map1 illustrates a pump shuttle rate map when the acceleration operation amount is equal to or more than the first operation amount. The second pump shuttle rate map Map2 illustrates a pump shuttle rate map when the acceleration operation amount is equal to or less than the second operation amount.

In the first pump shuttle rate map Map1, the pump shuttle rate is constant at r1 irrespective of changes in vehicle speed when the vehicle speed is less than a vehicle threshold va. The pump shuttle rate falls as the vehicle speed increases when the vehicle speed is equal to or more than the vehicle threshold va and is smaller than a vehicle threshold vb. The pump shuttle rate is zero when the vehicle speed is equal to or more than the speed threshold vb. The speed threshold va is an example of the second speed threshold in the present invention. The speed threshold vb is an example of the third speed threshold in the present invention.

The speed threshold va is higher than the speed threshold v1 described above. In addition, it is preferable that the speed threshold va be equal to or less than the speed threshold v2. The speed threshold vb is higher than the speed threshold v1 described above. The speed threshold vb is higher than the speed threshold va. In addition, it is preferable that the speed threshold vb be higher than the speed threshold v2.

In the second pump shuttle rate map Map2, the change in the pump shuttle rate with regard to the vehicle speed is the same as the first pump shuttle rate map Map1. However, the first pump shuttle rate map Map1 is set so that the pump shuttle rate is higher than in the second pump shuttle rate map Map2. Here, a different pump shuttle map, which is provided between the first pump shuttle rate map Map1 and the second pump shuttle rate map Map2, is used when the acceleration operation amount is a value between the first operation amount and the second operation amount.

Figure 10:
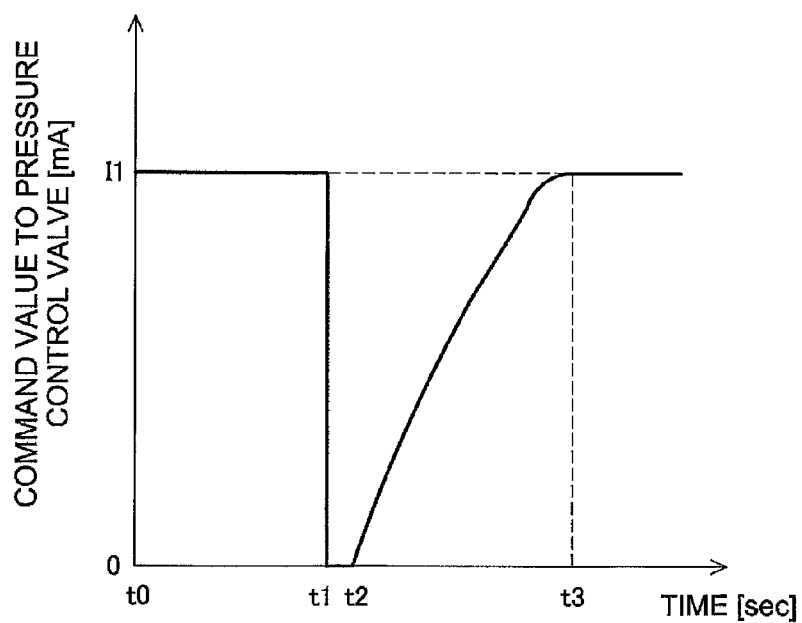
FIG. 10 is a diagram illustrating changes in a command value to a pressure control valve in a case where pump shuttle control is executed.

FIG. 10 is a timing chart illustrating changes in the command value to the pressure control valve 7 in a case where the pump shuttle control is executed. The normal control is executed at time t0. The command value to the pressure control valve 7 is I1 in the normal control.

An operation for switching between forward and backward progression using the forward and backward progression operation member 14 is performed at time t1, and the vehicle body controller 12 executes the pump shuttle control when the conditions for the application of the pump shuttle rate map described above have been satisfied. In the example shown in FIG. 10, the vehicle speed is equal to or more than the speed threshold vb. In this case, the pump shuttle rate, which is obtained by referencing the pump shuttle rate map, is zero. Accordingly, the vehicle body controller 12 reduces the command value to the pressure control valve 7 from I1 to zero at time t1.

The vehicle body controller 12 deactivates the pump shuttle control at time t2 when the conditions for the application of the pump shuttle rate map are no longer satisfied. As a result, the vehicle body controller 12 gradually increases the command value to the pressure control valve 7 from time t2 to time t3. The command value to the pressure control valve 7 returns to the original value I1 at time t3. In this manner, the vehicle body controller 12 reduces the command value to the pressure control valve 7 without applying modulation during execution of the pump shuttle control. In contrast to this, the vehicle body controller 12 gradually increases the command value to the pressure control valve 7 by applying modulation when the pump shuttle control has been deactivated and the command value to the pressure control valve 7 is returned to the original value I1.

Figure 11:
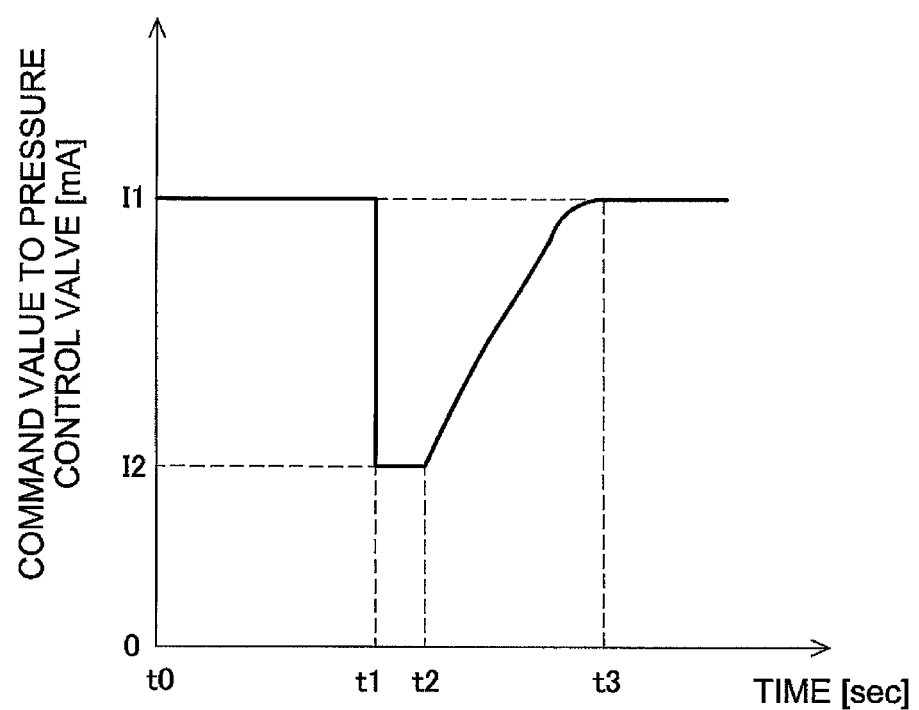
FIG. 11 is a diagram illustrating changes in a command value to a pressure control valve in a case where pump shuttle control is executed.

FIG. 11 is a timing chart illustrating changes in the command value to the pressure control valve 7 in a case where the pump shuttle control is executed. The normal control is executed at time t0. The command value to the pressure control valve 7 is I1 in the normal control.

An operation for switching between forward and backward progression using the forward and backward progression operation member 14 is performed at time t1, and the vehicle body controller 12 executes the pump shuttle control when the conditions for the application of the pump shuttle rate map described above have been satisfied. In the example shown in FIG. 11, the vehicle speed is less than the speed threshold va. In addition, the acceleration operation amount is equal to or more than the first operation amount. In this case, the pump shuttle rate, which is obtained by referencing the first pump shuttle rate map, is r1. Accordingly, the vehicle body controller 12 reduces the command value to the pressure control valve 7 from I1 to I2 at time t1. The command value I2 is a value where r1 is multiplied with I1.

The vehicle body controller 12 deactivates the pump shuttle control at time t2 when the conditions for the application of the pump shuttle rate map are no longer satisfied. As a result, the vehicle body controller 12 gradually increases the command value to the pressure control valve 7 from time t2 to time t3. The command value to the pressure control valve 7 returns to the original value I1 at time t3. In this manner, the vehicle body controller 12 reduces the command value to the pressure control valve 7 without applying modulation during execution of the pump shuttle control. In contrast to this, the vehicle body controller 12 gradually increases the command value to the pressure control valve 7 by applying modulation when the pump shuttle control has been deactivated and the command value to the pressure control valve 7 is returned to the original value I1.

In the work vehicle 50 according to the embodiment, the vehicle body controller 12 executes the pump shuttle control when switching between forward and backward progression using the forward and backward progression operation member 14. In the pump shuttle control, the pump pilot pressure is reduced by reducing the command value to the pressure control valve 7. Due to this, it is possible to suppress shocks when switching between forward and backward progression. In addition, it is possible to improve the responsiveness of control of the first hydraulic pump 4 since it is not necessary to dispose an aperture between the pressure control valve 7 and the pump displacement control cylinder 6 in the pump pilot circuit 32.

The vehicle body controller 12 deactivates the pump shuttle control in the pump shuttle control when the first predetermined time has elapsed since switching between forward and backward progression. In a case where the vehicle speed V is equal to or more than the speed threshold v2, the first predetermined time is the predetermined time tm2. When the vehicle speed V is less than the speed threshold v2, the first predetermined time is the predetermined time tm3. Due to this, it is possible to deactivate the pump shuttle control and return to the normal control when the time when there is a possibility that shocks will be generated has elapsed since switching between forward and backward progression.

The predetermined time tm2 is longer than the predetermined time tm3. Accordingly, the vehicle body controller 12 sets the first predetermined time (tm2) when the vehicle speed is equal to or more than the speed threshold v2 to be longer than the first predetermined time (tm3) when the vehicle speed is less than the speed threshold v2. Due to this, it is possible to maintain the pump shuttle control for a longer time when the vehicle speed is equal to or more than the speed threshold v2 than when the vehicle speed is less than the speed threshold v2. When the vehicle speed is higher, the period of time when shocks are generated is longer. As a result, it is possible to suppress the generation of shocks by the pump shuttle control being maintained for a longer time when the vehicle speed is high.

As shown in FIG. 9, the pump shuttle rate in the pump shuttle rate map is reduced as the vehicle speed increases when the vehicle speed is equal to or more than the speed threshold va. Accordingly, the vehicle body controller 12 reduces the command value to the pressure control valve 7 as the vehicle speed increases in the pump shuttle control when the vehicle speed is equal to or more than the speed threshold va. Due to this, it is possible to suppress the generation of shocks.

As shown in FIG. 9, the pump shuttle rate in the pump shuttle rate map is constant irrespective of changes in the vehicle speed when the vehicle speed is smaller than the speed threshold va. Accordingly, the vehicle body controller 12 reduces the command value to the pressure control valve 7 using a constant value irrespective of change in the vehicle speed in the pump shuttle control when the vehicle speed is less than the speed threshold va. As a result, variation in the pump pilot pressure is suppressed irrespective of changes in the vehicle speed when the vehicle speed is less than the speed threshold va. There is hardly any change in the size or the generation time of the shocks even if there is a change in vehicle speed when the vehicle speed is extremely low. Accordingly, it is possible to avoid excessive reduction in the pump pilot pressure in such circumstances.

As shown by FIG. 9, the pump shuttle rate in the pump shuttle rate map is zero when the vehicle speed is equal to or more than the speed threshold vb. Accordingly, the vehicle body controller 12 sets the command value to the pressure control valve 7 to zero in the pump shuttle control when the vehicle speed is equal to or more than the speed threshold vb. As a result, it is possible to reduce the pump pilot pressure to a minimum value in circumstances where the vehicle speed is high and it is possible for large shocks to be generated. Due to this, it is possible to suppress the generation of shocks even when the speed is high.

In step S3 of FIG. 8, the vehicle body controller 12 does not execute the pump shuttle control when the vehicle speed is less than the speed threshold v1. Due to this, it is possible to avoid excessive reduction in the pump pilot pressure in circumstances where the vehicle speed is low such that only small shocks are generated. It is possible to suppress time lag to the generation of the drive force in the operation direction of the forward and backward progression operation member 14 to be short.

As shown in FIG. 9, the pump shuttle rate is higher in the case where the first pump shuttle rate map Map1 is used than in a case where the second pump shuttle rate map Map2 is used. As a result, the vehicle body controller 12 increases the command value to the pressure control valve 7 to a greater extent when the acceleration operation amount is equal to or more than the first operation amount than when the acceleration operation amount is equal to or less than the second operation amount. That is, the amount of reduction in the command value to the pressure control valve 7 is smaller when the acceleration operation amount is large. There are often circumstances where the operator demands a large output when the acceleration operation amount is large. As a result, it is possible to quickly recover output of the first hydraulic pump 4 after the completion of the pump shuttle control by reducing the amount of reduction in the command value when the operation amount of the acceleration operation member is large. In addition, the operator is not sensitive with regard to the shocks when the acceleration operation amount is large.

In step S5 of FIG. 8, the vehicle body controller 12 deactivates the pump shuttle control when the drive circuit pressure is equal to or more than a value where the predetermined pressure value is added to the suction circuit pressure. The drive circuit pressure being equal to or more than a value where the predetermined pressure value is added to the suction circuit pressure has the meaning of a state where the traction force is large to the extent that the operator is not concerned about the shocks. Accordingly, it is possible to avoid unnecessary reduction in the pump pilot pressure due to the deactivating of the pump shuttle control when the traction force is large in this manner.

In step S4 of FIG. 8, the vehicle body controller 12 does not execute the pump shuttle control until the predetermined time tm1 has elapsed since switching between forward and backward progression using the forward and backward progression operation member 14. Accordingly, it is possible to avoid instability in switching between forward and backward progression in the work vehicle 50 in an instant of switching between forward and backward progression using the forward and backward progression operation member 14.

As shown in FIG. 10 and FIG. 11, the vehicle body controller 12 returns the command value to the original value by applying modulation after the command value has been reduced without applying modulation in the pump shuttle control. As a result, it is possible to reduce the command value more swiftly than to return the command value to its original value when switching between forward and backward progression. An inclination recovery force acts when driving the first hydraulic pump 4. The inclination recovery force is a reaction force which acts in a direction to restore the inclination angle. For example, a reaction force is generated in a direction which restores the inclination angle to an angle in the backward progression direction when the hydraulic pump is driven in the forward progression direction. As a result, the inclination angle quickly changes toward the backward progression direction in an instant where forward progression is switched from forward progression to backward progression. In this case, there is a possibility that a large shock will be generated. In the work vehicle 50 according to the embodiment, it is possible to suppress the generation of shocks due to the inclination recovery force since it is possible to swiftly reduce the command value when switching between forward and backward progression.

Above, the embodiment of the present invention has been described but the present invention is not limited to the embodiment described above and various modifications are possible within a range which does not depart from the gist of the invention.

In the embodiment, a wheel loader is described as an example as a work vehicle where the present invention is applied. However, the present invention is not limited to this. For example, it is possible for the present invention to be applied with regard to other work vehicles where an HST is mounted.

In the embodiment described above, the wheel loader, where the HST system with one pump and one motor including one hydraulic pump and movement hydraulic motor is mounted, is described as an example. However, the present invention is not limited to this. For example, the present invention may be applied with regard to a work vehicle where an HST system with one pump and two motors including one hydraulic pump and two hydraulic motors is mounted.

The conditions for application of the pump shuttle rate map are not limited to the conditions described above and may be appropriately changed. For example, a portion of the conditions described above may be omitted or changed. Alternatively, conditions which are different from the conditions described above may be added.

The pump shuttle rate map is not limited to the first pump shuttle rate map Map1 and the second pump shuttle rate map Map2 described above and may be appropriately changed.

The shuttle rate map may be stored in the vehicle body controller 12 in a format of a table or a formula.

According to the illustrated embodiment, it is possible to provide a work vehicle and a control method for a work vehicle where it is possible to improve responsiveness of control.

The invention claimed is:
1. A work vehicle comprising:
an engine;
a hydraulic pump configured to discharge hydraulic fluid due to being driven by the engine and configured and arranged to change a discharge direction of the hydraulic fluid;
a hydraulic motor configured to be driven by the hydraulic fluid which is discharged from the hydraulic pump, a driving direction of the hydraulic motor being changed between a forward progression direction and a backward progression direction according to the discharge direction of the hydraulic fluid from the hydraulic pump;
a pump displacement control cylinder configured to control a displacement of the hydraulic pump according to pressure of the hydraulic fluid which is supplied to the pump displacement control cylinder and to switch the discharge direction of the hydraulic fluid from the hydraulic pump according to a supply direction of the hydraulic fluid which is supplied to the pump displacement control cylinder;
a forward and backward progression switching valve configured to switch the supply direction of the hydraulic fluid to the pump displacement control cylinder;
a pressure control valve configured to control the pressure of the hydraulic fluid which is supplied to the pump displacement control cylinder according to a command value which is input to the pressure control valve;
a forward and backward progression operation member configured to be operated in order to switch forward and backward progression of the vehicle; and
a control section configured to execute pump shuttle control which reduces the command value to the pressure control valve when switching between forward and backward progression using the forward and backward progression operation member.

2. The work vehicle according to claim 1, wherein
the control section is configured to deactivate the pump shuttle control when a first predetermined period of time has elapsed since the time of switching between forward and backward progression.

3. The work vehicle according to claim 2, wherein
the control section is configured to set the first predetermined period of time when a vehicle speed is equal to or more than a first speed threshold to be longer than the first predetermined period of time when the vehicle speed is less than the first speed threshold.

4. The work vehicle according to claim 1, wherein
the control section is configured to reduce the command value as a vehicle speed increases in the pump shuttle control when the vehicle speed is equal to or more than a second speed threshold.

5. The work vehicle according to claim 4, wherein
the control section is configured to hold a rate of reduction in the command value constant irrespective of changes in the vehicle speed in the pump shuttle control when the vehicle speed is less than the second speed threshold.

6. The work vehicle according to claim 4, wherein
the control section is configured to set the command value to zero in the pump shuttle control when the vehicle speed is equal to or more than a third speed threshold which is higher than the second speed threshold.

7. The work vehicle according to claim 1, wherein
the control section is configured not to execute the pump shuttle control when the vehicle speed is smaller than a fourth speed threshold.

8. The work vehicle according to claim 1, further comprising
an acceleration operation member configured to set a target rotation speed for the engine,
wherein the control section is configured to increase the command value in the pump shuttle control when an operation amount of the acceleration operation member is a first operation amount more than the command value when the operation amount of the acceleration operation member is a second operation amount which is smaller than the first operation amount.

9. The work vehicle according to claim 1, further comprising
a first drive circuit and a second drive circuit which connect the hydraulic pump and the hydraulic motor,
wherein the hydraulic fluid which flows out from the hydraulic motor flows into the hydraulic pump via the second drive circuit when the hydraulic fluid which flows out from the hydraulic pump flows into the hydraulic motor via the first drive circuit,
the hydraulic fluid which flows out from the hydraulic motor flows into the hydraulic pump via the first drive circuit when the hydraulic fluid which flows out from the hydraulic pump flows into the hydraulic motor via the second drive circuit,
hydraulic pressure in a circuit out of the first drive circuit and the second drive circuit which is a circuit where the hydraulic fluid flows from the hydraulic pump to the hydraulic motor is set as a drive circuit pressure and hydraulic pressure in a circuit out of the first drive circuit and the second drive circuit which is a circuit where the hydraulic fluid flows from the hydraulic motor to the hydraulic pump is set as a suction circuit pressure, and
the control section is configured to deactivate the pump shuttle control when the drive circuit pressure is equal to or more than a value obtained by adding a predetermined pressure value to the suction circuit pressure.

10. The work vehicle according to claim 1, wherein
the control section is configured to execute the pump shuttle control at a point in time when a second predetermined period of time has elapsed since switching between the forward and backward progression.

11. The work vehicle according to claim 1, wherein
the control section is configured to return the command value to an original value in the pump shuttle control by applying modulation after the command value has been reduced without modulation being applied.

12. The work vehicle according to claim 1, wherein
the control section is configured to set the command value to the pressure control valve to a normal command value, which is a value according to a rotation speed of the engine, during normal control in which the pump shuttle control is deactivated, and
the control section is configured to reduce the command value to the pressure control valve to a value less than the normal command value in the pump shuttle control.

13. A control method of a work vehicle comprising:
detecting an operation for switching forward and backward progression of the work vehicle using a forward and backward progression operation member;
switching a supply direction of hydraulic fluid to a pump displacement control cylinder;
switching a discharge direction of the hydraulic fluid from a hydraulic pump using the pump displacement control cylinder;
switching a driving direction of a hydraulic motor according to the switching of the discharge direction of the hydraulic pump; and
reducing pressure of the hydraulic fluid which is supplied to the pump displacement control cylinder when switching the forward and backward progression using the forward and backward operation member.

* * * * *